United States Patent [19]

Oldham et al.

[11] 4,313,028
[45] Jan. 26, 1982

[54] CABLE TERMINATION SECUREMENT

[75] Inventors: Ronald C. Oldham, Chandlers Ford; Peter Worthington, Southampton, both of England

[73] Assignee: International Standard Electric Corporation, New York, N.Y.

[21] Appl. No.: 124,384

[22] Filed: Feb. 25, 1980

[30] Foreign Application Priority Data

Feb. 27, 1979 [GB] United Kingdom ............... 06839/79

[51] Int. Cl.³ ............................................. H02G 15/14
[52] U.S. Cl. .................................... 174/70 S; 29/869; 174/89
[58] Field of Search ..................... 174/84 R, 70 S, 79, 174/88 C, 89; 29/869

[56] References Cited

U.S. PATENT DOCUMENTS 2,877,031 3/1959 Lee ................................... 174/89 X
3,600,499 8/1971 Hibbs ........................... 174/88 C X Primary Examiner—Gene Z. Rubinson
Assistant Examiner—D. A. Tone
Attorney, Agent, or Firm—John T. O'Halloran; Thomas N. Twomey

[57] ABSTRACT

A termination between a lightweight submarine coaxial cable (1) and a tail cable (2) connectible to a submersible repeater includes slip inducing means (8, 14) arranged on the joint (4) and a portion of the submarine cable (1) adjacent the joint such that armour wires arranged on a predetermined length of the submarine cable (1), including the portion, and on the joint (4) will slip during transfer of tensile load from the cable (1) to the repeater housing and not cause compression forces that can damage the joint (4). The length of the armour wires applied directly to the submarine cable sheath is chosen to be sufficient to transfer the tensile load on the cable safely to the repeater housing.

8 Claims, 1 Drawing Figure

U.S. Patent
Jan. 26, 1982
4,313,028
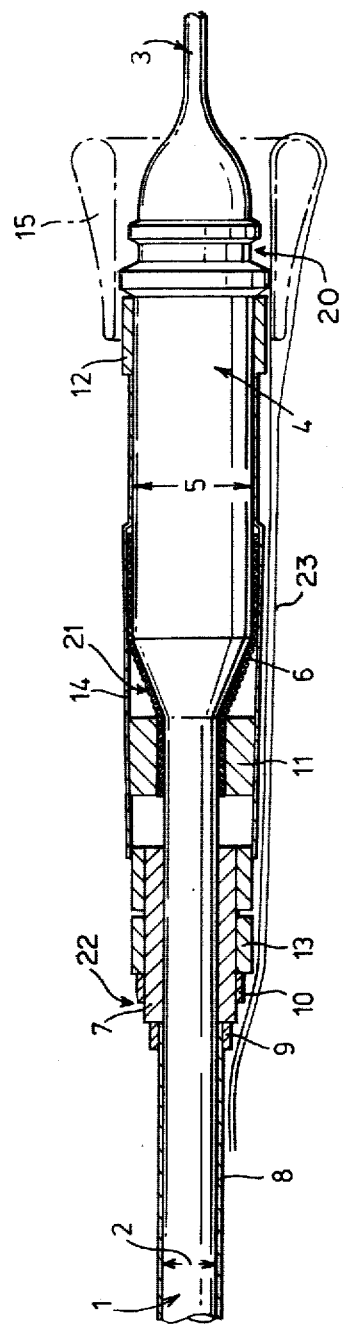

CABLE TERMINATION SECUREMENT

This invention relates to a cable termination, particularly but not exclusively connecting a lightweight submarine coaxial cable to a submersible repeater housing.

A submarine coaxial cable which is to be secured to a submersible repeater housing is generally terminated into a tail cable of smaller dimensions and to a repeater tail cable to which it can subsequently be joined. The termination joint can involve the use of a conventional castellated water barrier assembly, as described for example in our British Pat. No. 1280439 (H. A. Moore 8-7-7), and the result of making such a termination joint is that the diameter of the cable over the region of the joint is of a diameter larger than that of the basic submarine cable, which is in turn larger than the diameter of the tail cable. The terminated cable must be secured to the repeater housing such that torsional movement of the cable is not permitted. This may be achieved by means of anchoring armour wires, arranged at least over the joint and a portion of the length of the cable adjacent the joint, and an armour cone arranged on the armour wires on the joint, the armour wires being clamped between the armour cone and a split armour clamp arrangement. The clamp arrangement is fastened to an anchor plate secured in the end of the repeater housing. Such a method of clamping and securing is described in U.S. Pat. No. 4,259,543.

The armour wires are laid directly on the termination oversheath tube and the sheath of the basic submarine cable. When a load is applied to the basic submarine cable to pull it away from the repeater housing, the armour wires grip and at the same time apply compression to the cable. If the compression is excessive damage may result to the cable components.

It is an object of the present invention to ensure that the armour wires on application of a load to a cable will not cause damage to the cable or to a cable joint if one is present, or at least reduce the likelihood.

According to one aspect of the present invention there is provided a termination between a cable having a tensile strength member, and a structure, wherein anchor wires secured to the structure are applied over a predetermined length of the cable adjacent thereto grip the cable and transfer the tensile load on the cable to the structure, and wherein means are provided to reduce the grip of the wires relative to the cable over an initial portion of the predetermined length adjacent the structure so as to minimise if not eliminate damage to the cable during tensile load transfer and minimise if not eliminate tensile load transfer to the initial portion.

According to another aspect of the present invention there is provided a method of making a termination between a submarine cable having an internal tensile strength member and a tail cable connectible to a submersible repeater, comprising the steps of jointing the submarine cable and the tail cable, providing slip inducing means on the joint and a portion of the submarine cable adjacent thereto, applying anchor wires over a predetermined length of the submarine cable including said portion and over said joint and securing the anchor wires to an armour cone provided on the joint.

Embodiments of the present invention will now be described with reference to the accompanying drawing which shows, somewhat schematically and partially sectioned, bedding material applied over a light-weight submarine cable termination.

A lightweight submarine cable 1 with an outer sheath diameter 2 is terminated into a tail cable 3 at a joint section 20 via a termination 4 having an oversheath tube with a diameter 5. A wire binder 6 is applied over the tapered transition area 21 between the termination 4 and the cable 1. Diameter 5 is always larger than diameter 2. A high density polyethylene tube 7 is arranged on the cable 1 spaced apart from binder 6. PTFE tape 8 is applied to the cable 1 to extend a predetermined distance from the tube 7. The tape 8 may be helically applied in two layers with opposite lay and zero overlap of adjacent turns. The left hand end of the tape 8 is secured to the cable 1 by, for example, PVC tape (not shown). PVC tape 9 is also used to secure the other end of the tape 8 and to build up a taper as indicated at 10.

A tubular element 11 is built up over the left hand end of binder 6 by winding, for example, PVC tape around the binder 6 to an overall diameter equivalent to the oversheath tube and wire binder diameter. A split polyethylene tube 12 may be positioned on the termination 4 as shown. PVC tape 13 is applied to the tube 7 to build up its diameter to that of the PVC element 11. PTFE tape 14 is then applied between the tape 13 and the tube 12, for example it may comprise two layers with opposite lay and 50% overlap between adjacent turns. The ends of the PTFE tape 14 may be secured with PVC tape (not shown).

Armour wires 23 are then layed in a conventional manner to extend over a length of the cable sheath adjacent the termination. The armour wires 23 are taken back over an armour cone 15 whose position is indicated by dotted lines arranged in a conventional manner on the termination 4 while the armour wires may terminate adjacent the cone 15 and be clamped between a clamping arrangement (not shown) and the cone, 15, it is advantageous if they extend back in a second layer at least over the layer of armour wires arranged on the PTFE tapes 8 and 14, and preferably for some 12 feet from the armour cone face adjacent the tail cable, and are applied with opposite lay in the two layers. This relaying with contra (opposite) lay serves to prevent excessive twist being imparted to the "free" submarine cable. The armour cone 15 may be of such a length as to extend between elements 3 and 12 as shown. The purpose of the tapered structure 22 comprising windings 9, 10 and 13 and tube 7 is to provide a surface over which the armour wires may be laid which tapers from diameter 5 to diameter 2, with respect to which the armour wires will slip, and which is spaced apart from the actual transition area between the termination 4 and the cable 1 thereby to prevent the transition area being damaged upon excessive loading of cable 1.

The presence of the PTFE tape for some 10 ft adjacent to the termination 4 means that on application of tensile loads to the submarine cable the armour wires arranged thereon will slip without gripping or transferring the load to the inner conductor and core thereunder, while the remainder of the armour wires arranged directly on the cable sheath will grip and transfer the load over a sufficiently long distance to prevent damage to the cable elements.

In addition to the use of the PTFE tapes as bedding material for inducing slip between the armour wires and the cable sheath and oversheath tube, it is possible to transfer the tensile load between the submarine cable and the repeater over much longer lengths than hitherto, such as 35 to 40 feet and thus spread the load transfer whereby to minimise damage to the cable and termination elements.

We claim:

1. A termination between a cable having a tensile strength member, and a structure, wherein anchor wires secured to the structure are applied over a predetermined length of the cable adjacent thereto to grip the cable and transfer the tensile load on the cable to the structure, and wherein means are provided to reduce the grip of the wires relative to the cable over an initial portion of the predetermined length adjacent the structure so as to minimise if not eliminate damage to the cable during tensile load transfer and minimise if not eliminate tensile load transfer to the initial portion.

2. A termination as claimed in claim 1, wherein the means comprise a slip inducing material applied between the initial portion and the anchor wires.

3. A termination as claimed in claim 2, wherein the material comprises a PTFE tape wound onto said initial portion.

4. A termination as claimed in claim 1, said initial portion having a diameter larger than the diameter of said cable, and said termination further comprising:
    a tapered transition area located adjacent said initial portion,
    a tapered structure provided on said cable and spaced apart from said transition area, said structure having a maximum diameter substantially the same as said initial portion.

5. A termination as claimed in claim 4, wherein the tapered structure includes a plastic sleeve arranged on the cable and windings of plastic tapes arranged on and adjacent thereto to provide the required taper.

6. A termination as claimed in any one of the preceding claims further including an armour cone arranged on the anchor wires on said initial portion, wherein the anchor wires are relaid back over the armour cone, the directions of lay of the two layers of anchor wires thus produced being opposite, whereby to prevent or minimise twisting of the cable.

7. A termination as claimed in claim 6 further comprising:
    a second cable, and
    a joint section connected to said second cable and said initial portion.

8. A method of making a termination between a submarine cable having an internal tensile strength member and a tail cable connectible to a submersible repeater, comprising the steps of jointing the submarine cable and the tail cable, providing slip inducing means on the joint and a portion of the submarine cable adjacent thereto, applying anchor wires over a predetermined length of the submarine cable including said portion and over said joint and securing the anchor wires to an armour cone provided on the joint.

* * * * *